United States Patent

[11] 3,596,580

[72] Inventor Waldemar T. Rentschler
 Black Forest, Germany
[21] Appl. No. 841,724
[22] Filed July 15, 1969
[45] Patented Aug. 3, 1971
[73] Assignee Prontor-Werk Alfred Gauthier G.m.b.H.
 Calmbach, Black Forest, Germany
[32] Priority July 25, 1968
[33] Germany
[31] P 17 72 948.5

[54] CAMERA SHUTTER TIMING CUTOFF SWITCH
 6 Claims, 5 Drawing Figs.
[52] U.S. Cl............................................. 95/10 C
[51] Int. Cl............................................. G03b 9/62,
 G03b 17/18
[50] Field of Search............................... 95/10 C

[56] References Cited
UNITED STATES PATENTS
3,429,244 2/1969 Wasillewski................ 95/10 C Primary Examiner—Samuel S. Matthews
Assistant Examiner—M. L. Gellner
Attorney—March, Le Fever & Wyatt ABSTRACT: A photographic camera that has an electronic timing device controlled in dependence upon light conditions by a photosensitive resistor in the circuit of the timing device. A lamp is disposed in the circuit to indicate the open state of the camera shutter and a manually operated switch is placed in the circuit and is operable to cause the camera shutter to close independently of the action of the timing device. A switch button formed as a translucent body is connected to the switch and is disposed to be illuminated by the lamp to indicate the open state of the camera.

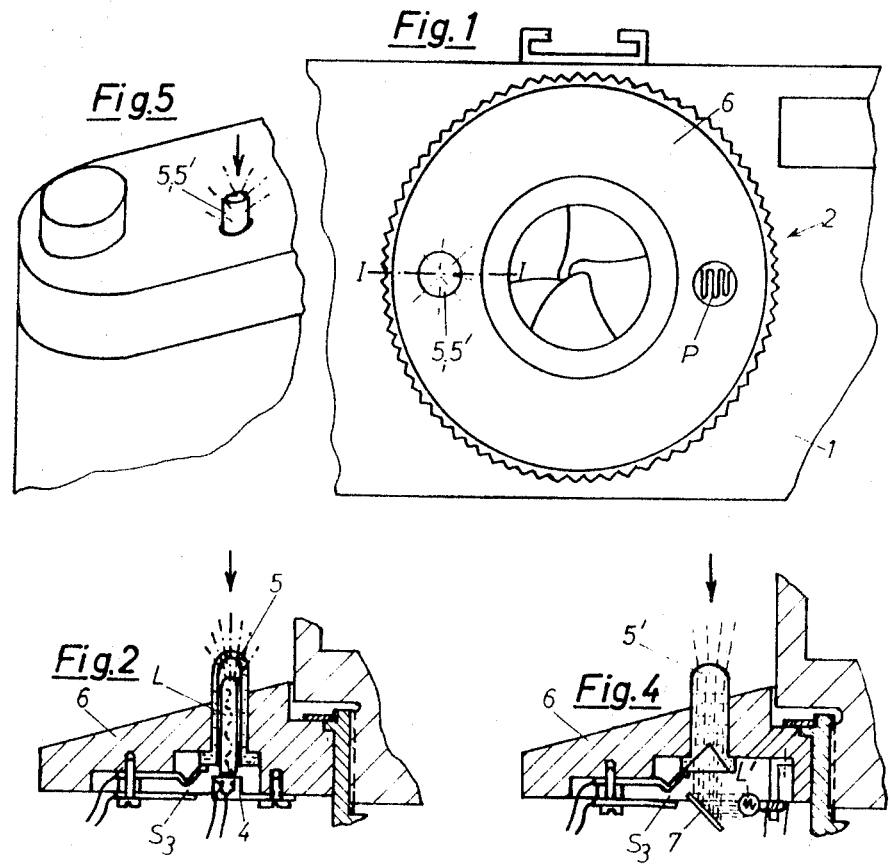
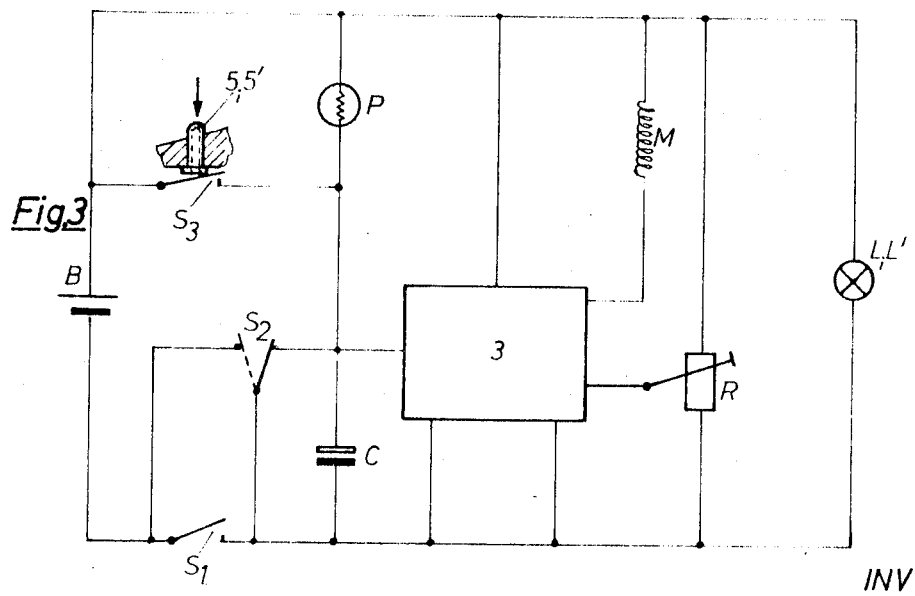

CAMERA SHUTTER TIMING CUTOFF SWITCH

The invention relates to a photographic camera with an electronic timing device controlled in dependence upon ambient light conditions with an indicating device indicating the open state of the camera shutter by means of a lit lamp, and having a manually operated switch in the circuit of the electronic timing device, the actuation of which switch allows the camera shutter to be closed independently of the action of the timing device.

In a photographic camera having a shutter for taking photographs with long exposure times, it is known to use an indicating device which during exposure indicates the open state of the shutter blade system. The object of such an arrangement is to enable the camera user to ascertain at any time during an exposure whether the shutter is still open or not without listening to the sound of the shutter. Since the shutter action, particularly in electronic shutters, is almost silent, the said indicating device is used highly desirable in such cameras.

In electronic shutters with light-dependent control of the timing device it has already been proposed to use a switching device which is suitable for independently terminating the exposure under inadequate light conditions, i.e. in cases where the action of the switching circuit of the timing device would be unduly prolonged due to lack of light on the photosensitive element.

It is an object of the present invention to provide an association of the two devices in an electronic camera of the kind referred to, with the aim of ensuring simplified operation of the camera in conditions of poor light, e.g. when taking night photographs.

In accordance with the invention the button used to operate the shutter-closing switch is formed as a transparent member which lights up from the lamp indicating the open state of the camera shutter. Hence the indicating lamp not only fulfills its originally intended function, but also indicates the position of the switch button which is to be actuated in the dark to terminate the exposure. It is thus unnecessary for the photographer to carry a pocket torch which he would otherwise require to find the closure switch.

In a preferred embodiment the switch button is formed as a hollow body and is directly associated both with the shutter closing switch and the indicating lamp. If for spatial or structural reasons a direct association of the lamp with the switch button is not possible, this is overcome by arranging a reflector for the light rays between the switch button and indicating lamp. Preferably also the indicating lamp is cylindrical and simultaneously serves as the switch button.

The accompanying drawings show several possible embodiments and applications of the subject matter of the invention. In the drawings, FIG. 1 shows an illuminated shutter-closing switch in the faceplate of a camera shutter.

FIG. 2 is a cross section through the faceplate of the camera shutter along the section line I-I of FIG. 1, the switch button being formed as an illuminated hollow body.

FIG. 3 is a circuit diagram showing an open-time indicating lamp and a shutter-closing switch, including an electronic timing device, FIG. 4 is a cross section through the faceplate of a camera shutter on the same scale as FIG. 2 with the switch button formed as a solid member and a reflector to deflect the light of a remotely situated indicating lamp.

FIG. 5 shows an arrangement of the illuminated switch button in the camera body.

In FIG. 1 the housing of a camera, shown only partly herein is denoted by 1, and is provided with an electronic diaphragm shutter 2. Besides the usual mechanical components serving to open and close the lens aperture, the housing of the electronic shutter also accommodates an electric control device for timing as shown in the circuit diagram of FIG. 3. The control device may include a transistor-tripping circuit. It includes an electronic switch or amplifier 3 formed of transistors and resistors, a photoelectric resistor P, a capacitor C and an electromagnet M holding the shutter mechanism in the opened position for the required exposure time. A switch $S_1$ is provided to connect the circuit described above to the battery B, when actuating the camera release. Part of the switch $S_2$ is in parallel with switch $S_1$, so that if the switch $S_1$ is prematurely released, current is maintained to the circuit. An indicating lamp L retained in a holder 4 is connected to the battery B and is lit when the magnet M is energized. Release of the system for closing the lens aperture, which occurs on collapse of the magnetic field of electromagnet M, cuts the current supply to the indicating lamp L whereupon the latter is extinguished.

As further shown in the circuit diagram of the electronic timing device of FIG. 3 a further switch $S_3$ is located therein which is actuated by means of a switch button 5. By actuating this button and switch $S_3$ the photographer is able to influence the electric time control circuit, i.e. he can prevent the exposure from extending over an indefinitely long period if there is insufficient light intensity acting on the photosensitive resistor. When the switch button 5 is actuated during the action of the electronic timing device, a parallel connection to the photosensitive resistor P is established. The capacitor voltage jumps to the supply voltage, which in turn results in the collapse of the flux in the electromagnet M. This in turn releases the shutter system into the closing position by means not shown.

Since the pushbutton 5 serving to actuate the closing switch $S_3$ is in association with the indicating lamp L, both components should be so located with respect to one another that the lighting of the lamp located, for example, in the interior of the shutter housing, is clearly visible to the photographer via the switch button 5. For this purpose the switch button 5 is made of a light-permeable material, such as transparent plastics or the like. As shown in the embodiment of FIG. 2 the switch button 5 is guided so as to be longitudinally displaceable in the faceplate 6 of the shutter housing, and formed as a hollow body. The button has a cylindrical indicating lamp L substantially enclosed by the switch button. The association of switch $S_3$ with the switch button 5 is such that switch $S_3$ is closed when the button is depressed, but opens again when released. The same association of switch $S_3$ and a switch button 5' is shown in the embodiment of FIG. 4. Here the switch button 5' is made as a solid member and has a reflector 7 so associated therewith that light from lamp L' is conveyed to the translucent button and irradiated outwards thereby.

As shown in the embodiment of FIG. 1 the switch button 5 or 5' lit by the indicating lamp L is located in the region of the faceplate 6 of the electronic shutter 2, it is possible as shown in FIG. 5 to locate the switch button 5 or 5' of the indicating lamp L or L', and the closing switch $S_3$ in the camera housing, on the top or front face thereof.

Having thus described my invention I claim:

1. A photographic camera including electronic timing means controlled in dependence upon light conditions by a photosensitive resistor in the circuit of said electronic timing means, a lamp in said circuit to indicate the open state of the camera shutter, a manually actuated switch in said circuit operable to cause the camera shutter to close independently of the action of said timing means, and a switch button operably connected to said switch and formed as a translucent body disposed to be illuminated by said lamp to indicate the open state of the camera.

2. The photographic camera of claim 1 wherein said switch button is formed as a hollow body and said lamp extends into the interior of said hollow body, and wherein said switch button is directly engaged with said switch for actuation thereof.

3. The photographic camera of claim 1 wherein a light reflector is located between said switch button and said indicating lamp.

4. The photographic camera of claim 1 wherein said indicating lamp is cylindrical and functions as a pushbutton by acting directly on said switch.

5. A photographic camera including electronic timing means controlled in dependence upon light conditions by a photosensitive resistor, circuit means including said photosensitive resistor, said circuit means being operatively connected to said electronic timing means, a lamp in said circuit means indicating the open state of the camera shutter, a manually actuatable switch in said circuit means, said switch being operable to close said camera shutter independently of the action of said timing means, and a switch button moveably mounted on the housing of said camera and engageable with said switch, said switch button being a hollow translucent body with said lamp extending into the interior of said hollow body, said button being lit up by said lamp to indicate the open state of the camera shutter.

6. A photographic camera including electronic timing means controlled in dependence upon light conditions by a photosensitive resistor, circuit means including said photosensitive resistor, said circuit means being operatively connected to said electronic timing means, a lamp in said circuit means indicating the open state of the camera shutter, a manually actuatable switch in said circuit means, said switch being operable to close said camera shutter independently of the action of said timing means, and a translucent switch button moveably mounted on the housing of said camera and engageable with said switch, and a light reflector disposed between said switch button and said lamp to light up said switch button to indicate the open state of the camera shutter.